US012456787B2

(12) United States Patent
Xu

(10) Patent No.: US 12,456,787 B2
(45) Date of Patent: Oct. 28, 2025

(54) MULTI-MODE CAVITY FILTER AND CAVITY FILTERING DEVICE

(71) Applicant: SAMSUNG ELECTRONICS CO., LTD., Suwon-si (KR)

(72) Inventor: Fanghai Xu, Shenzhen (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 18/380,903

(22) Filed: Oct. 17, 2023

(65) Prior Publication Data

US 2024/0213641 A1 Jun. 27, 2024

(30) Foreign Application Priority Data

Dec. 26, 2022 (CN) ......................... 202211677559.9

(51) Int. Cl.

*H01P 1/207* (2006.01)
*H01P 1/202* (2006.01)
*H01P 1/208* (2006.01)
*H01P 7/06* (2006.01)

(52) U.S. Cl.

CPC .............. *H01P 1/207* (2013.01); *H01P 1/202* (2013.01); *H01P 1/2082* (2013.01); *H01P 7/06* (2013.01)

(58) Field of Classification Search

CPC ........ H01P 1/202; H01P 1/205; H01P 1/2053; H01P 1/207; H01P 1/208; H01P 1/2082; H01P 1/20; H01P 1/201; H01P 7/06; H01P 7/04; H01P 7/00

See application file for complete search history.

(56) References Cited

U.S. PATENT DOCUMENTS 10,109,905 B2 * 10/2018 Park .......................... H01P 7/04
2016/0036115 A1 * 2/2016 Puoskari .................. H01P 7/06 333/222
2024/0413514 A1 * 12/2024 Xiao ..................... H01P 1/2053

* cited by examiner

*Primary Examiner* — Stephen E. Jones
(74) *Attorney, Agent, or Firm* — Sughrue Mion, PLLC

(57) ABSTRACT

A multi-mode cavity filter includes: a metal cavity formed into a hollow shape; and a plurality of resonators supported in suspension within the metal cavity and not contacting with an inner wall of the metal cavity. The plurality of resonators includes: a first resonator configured to generate a first resonant frequency; and a second resonator electrically connected to the first resonator and configured to generate a second resonant frequency. The second resonator includes a plurality of resonance plates. A first number of the second resonant frequency is associated with a second number of the plurality of resonance plates.

20 Claims, 8 Drawing Sheets

MULTI-MODE CAVITY FILTER AND CAVITY FILTERING DEVICE

CROSS-REFERENCE TO RELATED APPLICATIONS

This application is based on and claims priority under 35 U.S.C. § 119 to Chinese Patent Application No. 202211677559.9, filed on Dec. 26, 2022, in the Chinese Intellectual Property Office, the disclosure of which is incorporated by reference herein in its entirety.

BACKGROUND

1. Field

The disclosure relates to the field of a communication technology, and particularly to a multi-mode cavity filter and a cavity filtering device.

2. Description of Related Art

With the growth of the communication technology, there are higher and higher requirements for filter's performance, volume, cost, and the like. Thus, the filter is facing a major challenge.

A multi-mode resonator may effectively reduce the volume of the filter and are used by many filter engineers. A multi-mode resonator below 5 GHz is mainly made of a piece of dielectric material. The dielectric is processed into a specific shape to generate two or three resonant modes, and the corresponding coupling structure is used to realize the filtering function.

The filter uses the multi-mode dielectric resonator may prevent the loss and reduce the volume. However, because it is difficult to design the filter, and the production and assembly process is complex and costs high, the filter fails to be mass generated. As the operating frequency of the filter is higher and higher, its bandwidth is expected to be wider and wider. The cavity filter and dielectric waveguide filter have been unable to meet the requirement for wider and wider bandwidth due to the structural limitation. With the higher operating frequency of the filter, a harmonic generated by a flying rod has a greater inhibition impact on a near-end of a passband.

SUMMARY

Provided are a multi-mode cavity filter and a cavity filtering device including the multi-mode cavity filter. The device realizes a plurality of resonant frequencies by a metal cavity filter and may produce an adjustable null point, thereby omitting a coupling structure of a flying rod. Provided is a multi-mode cavity filter that includes a metal cavity and a resonator.

According to an aspect of the disclosure, a multi-mode cavity filter includes: a metal cavity formed into a hollow shape; and a plurality of resonators supported in suspension within the metal cavity and not contacting with an inner wall of the metal cavity. The plurality of resonators includes: a first resonator configured to generate a first resonant frequency; and a second resonator electrically connected to the first resonator and configured to generate a second resonant frequency, wherein the second resonator comprises a plurality of resonance plates, and wherein a first number of the second resonant frequency is associated with a second number of the resonance plates.

The metal cavity is formed into a hollow shape. In one embodiment, the first resonator is a coaxial resonator. The first resonator includes a first resonance cylinder and a second resonance cylinder. The first resonance cylinder and the second resonance cylinder are coaxially connected in an axial direction. A first diameter of the first resonance cylinder is greater than a second diameter of the second resonance cylinder. The first resonance cylinder and the second resonator are separately connected to two ends of the second resonance cylinder.

In one embodiment, the plurality of resonance plates are arranged radially around the second resonance cylinder. A first end of each of the resonance plates is connected to an end portion of the second resonance cylinder. The first number of the second resonant frequency (generated by the second resonator) is one less than the second number of the resonance plates.

In one embodiment, the plurality of resonance plates are distributed at equal angular intervals.

In one embodiment, the second resonator includes one or more resonance arms that extend radially from a second end of each of the resonance plates and that are coplanar with the resonance plates.

In one embodiment, a first width of each of the one or more resonance arms is greater than or equal to a second width of each of the resonance plates, and each of the one or more resonance arms form an angle with each of corresponding resonance plates.

In one embodiment, the second resonator includes a flange connected to the second end of each of the resonance plates and extending towards the first resonator in a direction perpendicular to the resonance plates.

In one embodiment, the multi-mode cavity filter generates a null point, and a strength of the null point is associated with an impedance of the second resonator.

In one embodiment, the multi-mode cavity filter includes a tuning screw. The tuning screw extends into the metal cavity to adjust a position of the null point.

According to an aspect of the disclosure, a cavity filtering device includes at least two adjacent multi-mode cavity filters. The at least two adjacent multi-mode cavity filters are coupled via a coupling structure. Two ends of the coupling structure extend into metal cavities of the two adjacent multi-mode cavity filters, respectively, to couple with the resonance plates.

In one embodiment, the multi-mode cavity filters are arranged along a straight line.

It may be seen from the above technical solutions that the embodiment achieves the filtering function by the metal cavity filter. Specifically, the filter of the embodiments includes a metal resonator, which achieves a double-mode or even a multi-mode resonant frequency by two different resonators coupled to each other. In particular, the first resonator is used to produce the first resonant frequency corresponding to a resonant mode. The second resonator is used to produce the second resonant frequency, in which the second resonant frequency corresponds to a resonant frequency or resonant mode generated by the second resonator and is not limited to a particular resonant frequency or resonant mode. That is, the second resonator includes the plurality of resonance plates, the number of the resonance plates is associated with that of the second resonant frequency, and a plurality of the second resonant frequencies are different from each other.

The plurality of resonance plates are arranged at equal angular intervals around a bottom end of the second resonance cylinder so as to form different radiation directions of the electric field. The number of the resonance plates is associated with that of the second resonant frequency and corresponds to that of resonant frequencies of the cavity filter.

BRIEF DESCRIPTION OF THE DRAWINGS

In order to illustrate the technical solutions of the embodiments more clearly, the drawings that need to be used in the description of the embodiments of the disclosure will be briefly described below. It is apparent that the drawings in the following description are only some embodiments of the disclosure, and other drawings may be obtained by those skilled in the art according to the drawings without creative work.

DETAILED DESCRIPTION

Figure 1:
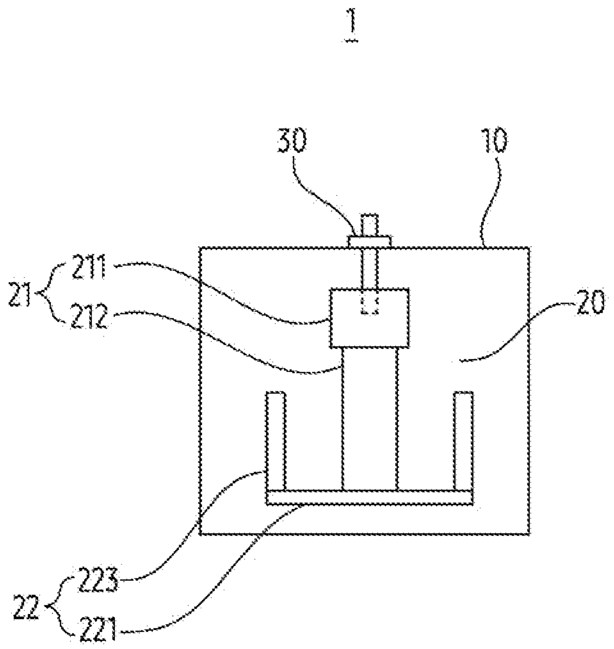
FIG. 1 is a side view of a multi-mode cavity filter of the exemplary disclosure.

To better understand the above technical solutions, the exemplary embodiments of the disclosure will be described in detail with reference to the drawings. It is apparent that the embodiments described are only part of, but not all of the embodiments of the disclosure. It should be understood that the disclosure is not limited by the exemplary embodiments described herein.

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

The block diagrams of equipment, device, apparatus, and systems involved in the disclosure are merely illustrative examples, which are not intended to require or imply that the connections, arrangements, and configurations must be made in the manner shown in the block diagrams. The equipment, device, apparatus, and systems may be connected, arranged, and configured in any manner, as will be appreciated by those skilled in the art.

Embodiments of the disclosure provide a multi-mode cavity filter and a cavity filtering device including the multi-mode cavity filter. The device realizes a plurality of resonant frequencies by a metal cavity filter and may produce an adjustable null point, thereby omitting a coupling structure of a flying rod.

Figure 2:
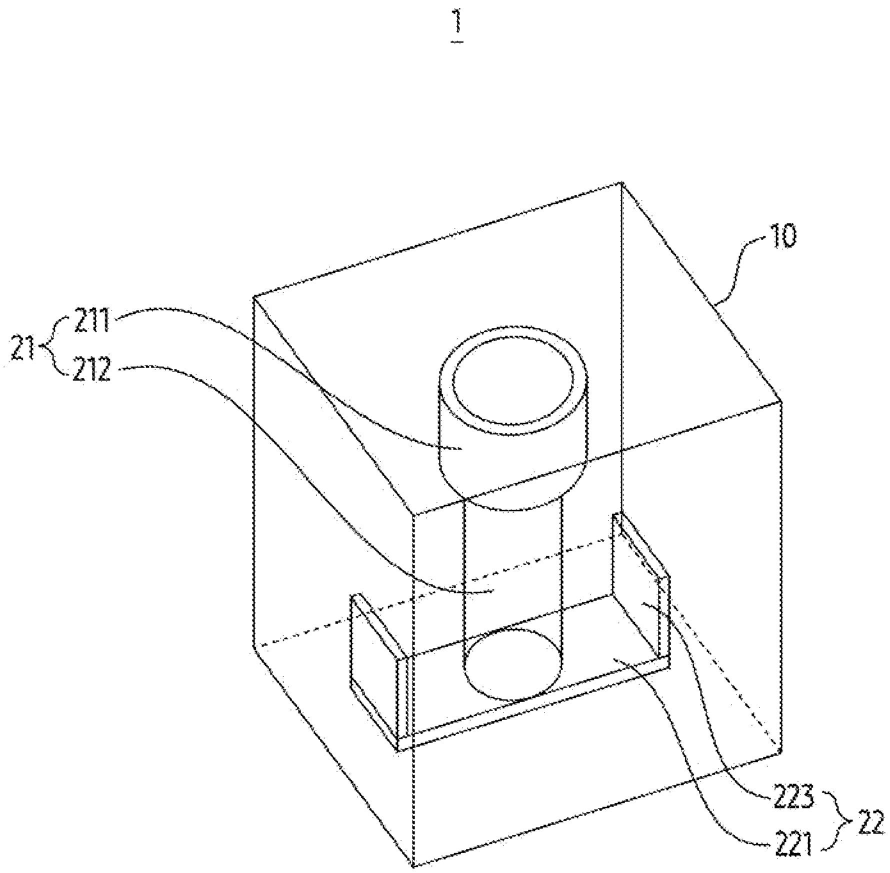
FIG. 2 is a schematic structural diagram of a multi-mode cavity filter of the exemplary disclosure.
Figure 3A:
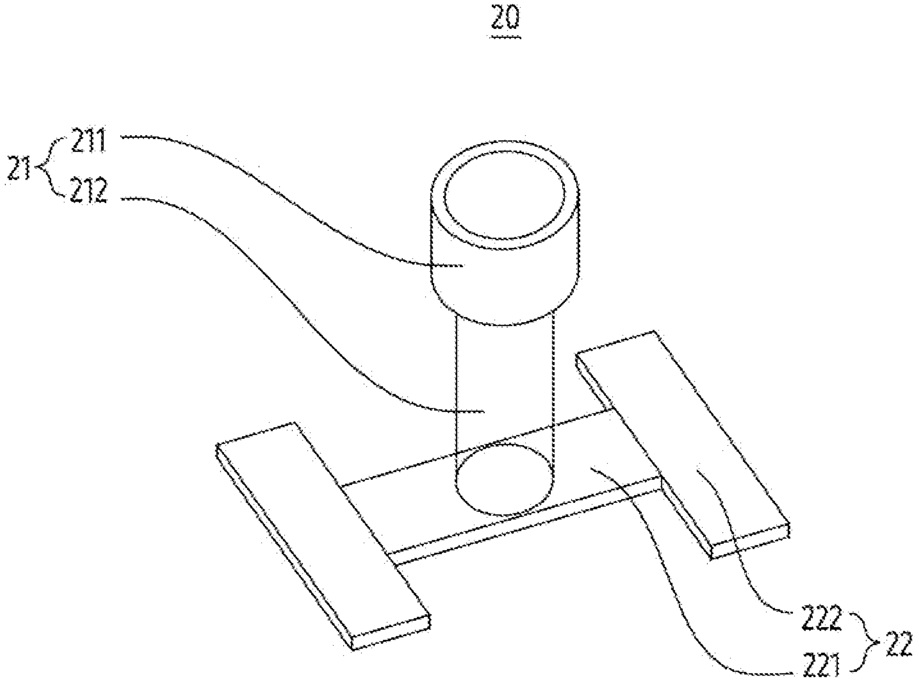
FIGS. 3A to 3C are schematic structural diagrams of resonators in multi-mode cavity filters of the exemplary disclosure.
Figure 3B:
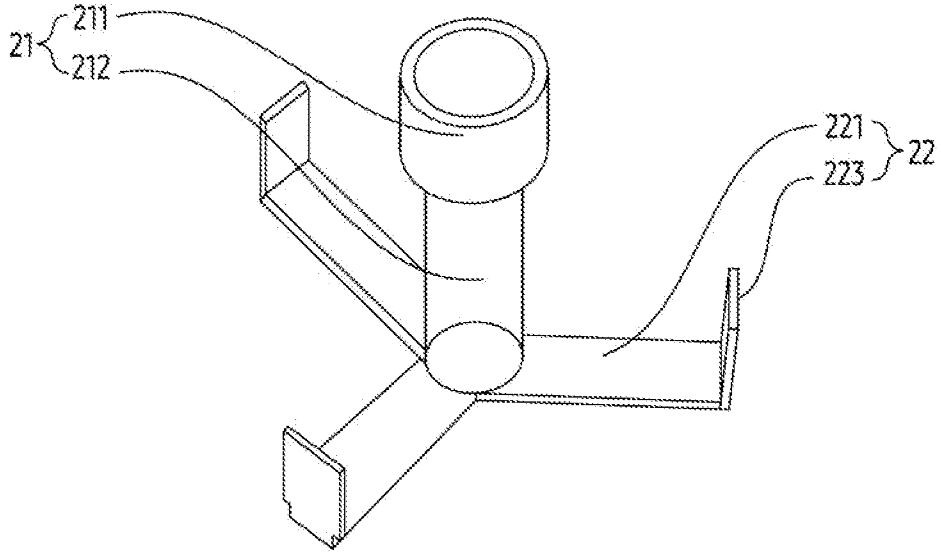
Figure 3C:
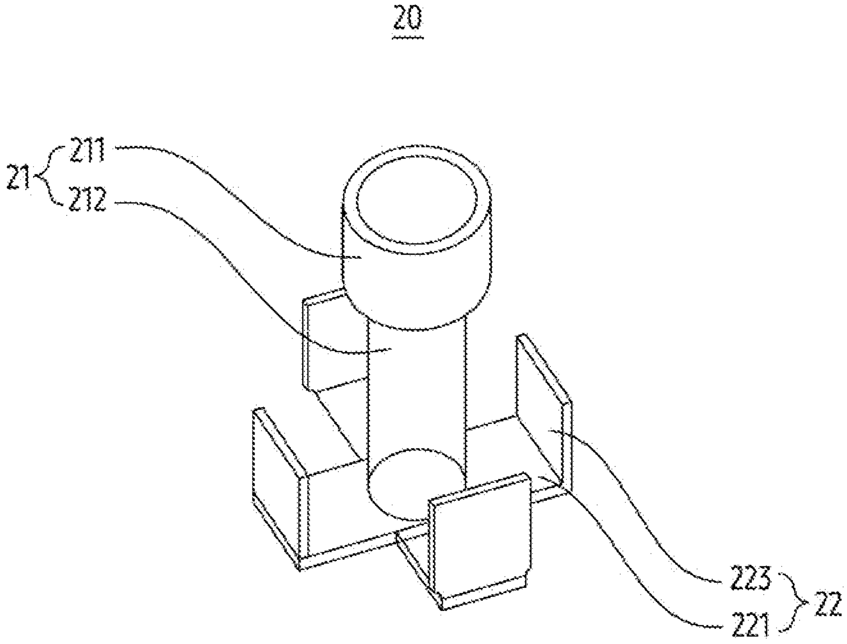

FIG. 1 is a side view of a multi-mode cavity filter of the exemplary disclosure. FIG. 2 is a schematic structural diagram of a multi-mode cavity filter of the exemplary disclosure. FIGS. 3A to 3C are schematic structural diagrams of resonators in multi-mode cavity filters of the exemplary disclosure.

As shown in FIGS. 1 and 2, one embodiment of the disclosure provides a multi-mode cavity filter 1. The multi-mode cavity filter includes a metal cavity 10 and a resonator 20.

The metal cavity 10 is formed into a hollow shape, such as a cuboid, a cylinder, and the like. The plurality of resonators 20 is supported in suspension within the metal cavity 10 and does not contact with an inner wall of the metal cavity 10. The plurality of resonators 20 includes a first resonator 21 and a second resonator 22.

The first resonator 21 generates a first resonant frequency. The second resonator 22 is electrically connected to the first resonator 21 and generates a second resonant frequency. The second resonator 22 includes a plurality of resonance plates 221, and the first number of the second resonant frequency (generated by the second resonator 22) is associated with the second number of the resonance plates 221.

The embodiment achieves the filtering function by the metal cavity filter. Specifically, the filter of the embodiments includes the plurality of resonators 20, which achieves a double-mode or even a multi-mode resonant frequency by two different resonators coupled to each other. In particular, the first resonator 21 is used to produce the first resonant frequency corresponding to a resonant mode. The second resonator 22 is used to produce the second resonant frequency, in which the second resonant frequency corresponds to a resonant frequency or resonant mode generated by the second resonator 22 and is not limited to a particular resonant frequency or resonant mode. That is, the second resonator 22 includes the plurality of resonance plates 221, the number of the resonance plates 221 is associated with that of the second resonant frequency, and a plurality of the second resonant frequencies are different from each other.

In the embodiment, the resonant frequencies are generated by the metal resonator (e.g., the plurality of resonators 20). Due to the flexible shape and form design, and being easy to install, the metal resonator may meet the requirements for bandwidth and structure size at the same time.

The plurality of resonators 20 is supported in suspension within the metal cavity 10, for example, by a structural part (not shown) made of an insulating medium and does not contact with an inner wall of the metal cavity 10. The plurality of resonators 20 enables the cavity filter 1 to have a transmission null point with an adjustable position. By adjusting the position of the null point, the transmission null point may be formed on a left side or a right side of the passband. When the transmission null point is formed to be capacitive, the coupling structure of the flying rod may be omitted so that the structure of the filter is more compact. Thus, the reduced cavity volume may meet the requirements for the bandwidth and volume of the filter, and an inhibition impact on a near-end of the passband of a harmonic generated by the flying rod is avoided.

In a specific example, the first resonator 21 is a coaxial resonator. The first resonator 21 includes a first resonance cylinder 211 and a second resonance cylinder 212. The first resonance cylinder 211 and the second resonance cylinder 212 are coaxially connected in an axial direction. A first diameter of the first resonance cylinder 211 is greater than a second diameter of the second resonance cylinder 212.

The first resonance cylinder 211 and the second resonator 22 are separately connected to two ends of the second resonance cylinder 212.

In one embodiment, the first resonance cylinder 211 is formed at a top end of the second resonance cylinder 212 and has the first diameter greater than the second diameter of the second resonance cylinder 212. The second resonator 22 is formed at a bottom end of the second resonance cylinder 212.

A central axis of the first resonator 21 may coincide with that of the metal cavity 10.

The plurality of resonance plates 221 are arranged radially around the second resonance cylinder 212. A first end of each of the resonance plates 221 is connected to an end portion of the second resonance cylinder 212. The plurality of resonance plates 221 are distributed at equal angular intervals.

The resonance plate 221 is formed into a plate shape. The plurality of resonance plates 221 are arranged at equal angular intervals around the bottom end of the second resonance cylinder 212 so as to form different radiation directions of the electric field. The first end of each of the resonance plates 221 is integrally connected to the bottom end of the second resonance cylinder 212, and a second end of each of the resonance plates 221 is suspended.

The number of the resonance plates 221 is at least two, and the first number of the second resonant frequency (generated by the second resonator 22) is one less than the second number of the resonance plates 221.

In one embodiment, when the number of the resonance plates 221 is two as shown in FIGS. 1, 2, and 3A, the first number of the second resonant frequency is one, and the second number of the resonance plates 221 of the cavity filter 1 is two. That is, the cavity filter 1 is formed as a double-mode cavity filter.

In one embodiment, when the number of the resonance plates 221 is three as shown in FIG. 3B, the first number of the second resonant frequency is two, and the second number of the resonance plates 221 of the cavity filter 1 is three. That is, the cavity filter 1 is formed as a multi-mode cavity filter.

In one embodiment, when the number of the resonance plates 221 is four as shown in FIG. 3C, the first number of the second resonant frequency is three, and the second number of the resonance plates 221 of the cavity filter 1 is four. That is, the cavity filter 1 is formed as a multi-mode cavity filter. Thus, the first number of the resonant frequencies of the cavity filter 1 corresponds to the second number of the resonance plates 221.

The multi-mode cavity filter 1 generates a null point, and a strength of the null point is associated with an impedance of the second resonator 22. To adjust the impedance of the second resonator 22, as shown in FIG. 3A, the second resonator 22 may further include one or more resonance arms 222 that extend radially from the second end of each of the resonance plates 221 and that are coplanar with the resonance plates 221.

The function of the one or more resonance arms 222 is to increase a length of each of the resonance plates 221 to adjust the impedance and frequency of the second resonator 22. The one or more resonance arms 222 extend radially from the second end of each of the resonance plates 221, and each of the one or more resonator arms 222 may form an angle with each of the resonance plates 221 to avoid increasing the volume of the metal cavity 10 while increasing the length of each of the resonance plates 221. The resonance plates 221 and the one or more resonance arms 222 are bent and extended to make full use of the space inside the metal cavity 10.

In a preferred example, a first width of each of the one or more resonance arms 222 is greater than or equal to a second width of each of the resonance plates 221.

In addition to the extended structure in the plane, as shown in FIGS. 1 and 2, the second resonator 22 may further include a flange 223 connected to the second end of each of the resonance plates 221 and extending towards the first resonator 21 in a direction perpendicular to the resonance plates 221.

The function of the flange 223 is similar to that of the one or more resonance arms 222, that is, to increase the length of each of the resonance plates 221 to adjust the impedance and frequency of the second resonator 22. The one or more resonance arms 222 make use of the space in the plane of the resonance plates 221, while the flange 223 makes use of the space between the resonance plates 221 and the first resonator 21.

As shown in FIG. 1, the cavity filter 1 of the embodiment may further include a tuning screw 30 extending into the metal cavity 10 to adjust the position of the null point.

Specifically, by adjusting the interference position of the tuning screw 30 with the first resonator 21, the adjustment of the position of the first resonant frequency and the null point may be achieved.

It may be seen from the above technical solutions that the embodiment achieves the filtering function by the metal cavity filter (e.g., the cavity filter 1). Specifically, the filter of the embodiments includes the metal resonator (e.g., the plurality of resonators 20), which achieves a double-mode or even a multi-mode resonant frequency by two different resonators coupled to each other. In particular, the first resonator 21 is used to produce the first resonant frequency corresponding to a resonant mode. The second resonator 22 is used to produce the second resonant frequency, in which the second resonant frequency corresponds to a resonant frequency or resonant mode generated by the second resonator 22 and is not limited to a particular resonant frequency or resonant mode. That is, the second resonator 22 includes the plurality of resonance plates 221, the number of the resonance plates 221 is associated with that of the second resonant frequency, and a plurality of the second resonant frequencies are different from each other.

The plurality of resonance plates 221 are arranged at equal angular intervals around the bottom end of the second resonance cylinder 212 so as to form different radiation directions of the electric field. The number of the resonance plates 221 is associated with that of the second resonant frequency and corresponds to that of resonant frequencies of the cavity filter 1.

Figure 4:
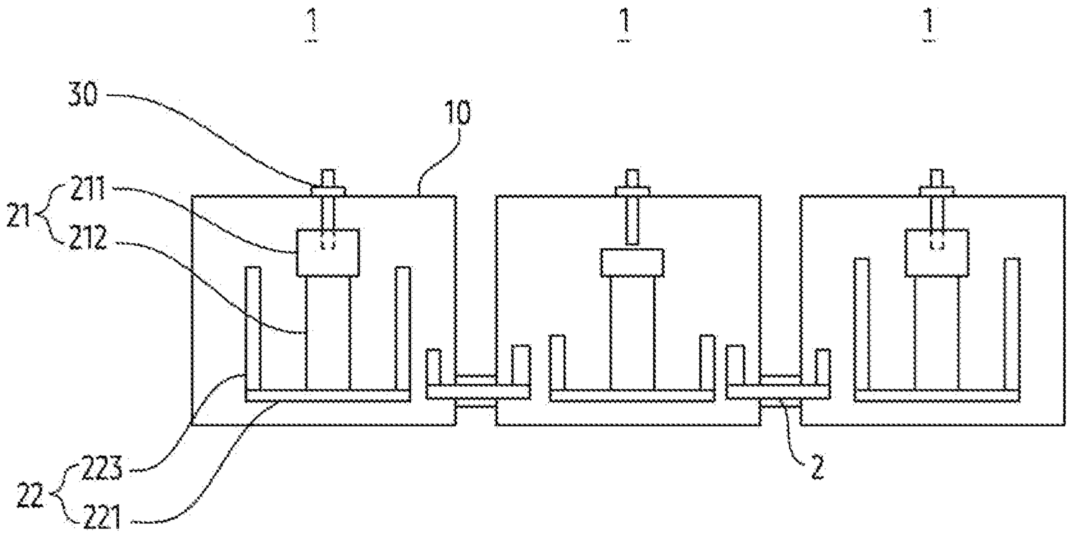
FIG. 4 is a side view of a cavity filtering device of the exemplary disclosure.
Figure 5:
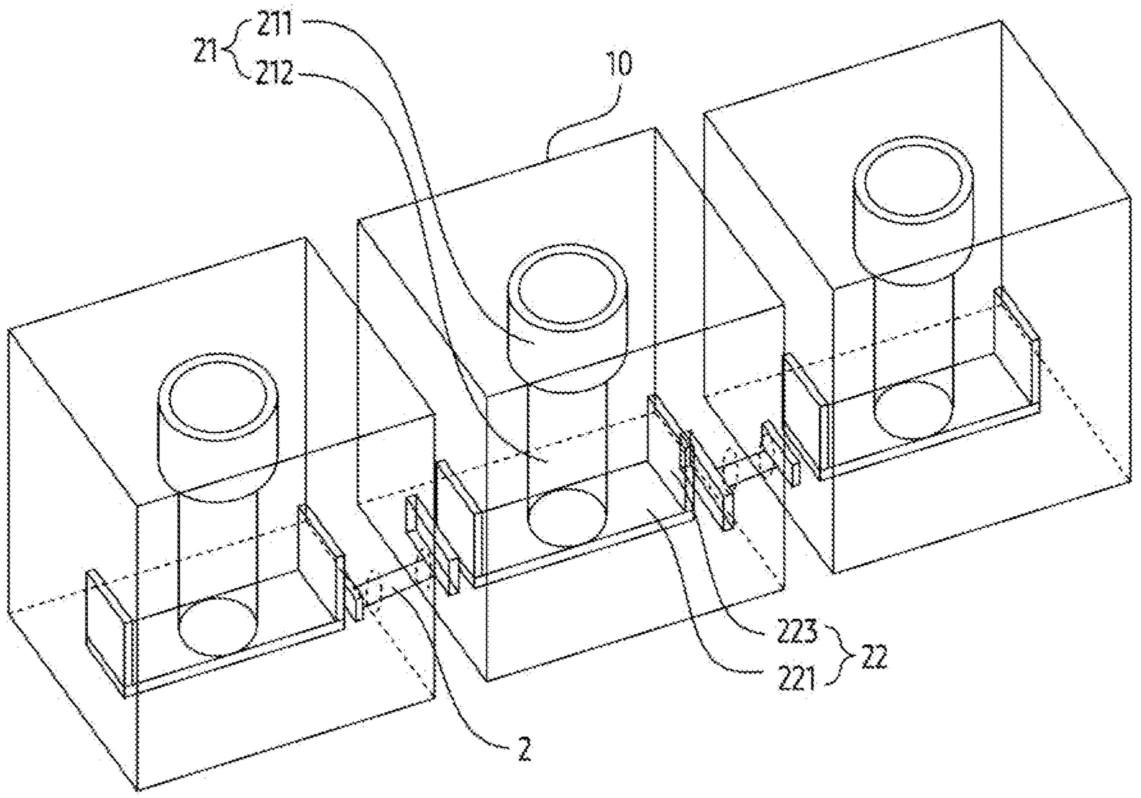
FIG. 5 is a schematic structural diagram of a cavity filtering device of the exemplary disclosure.
Figure 6:
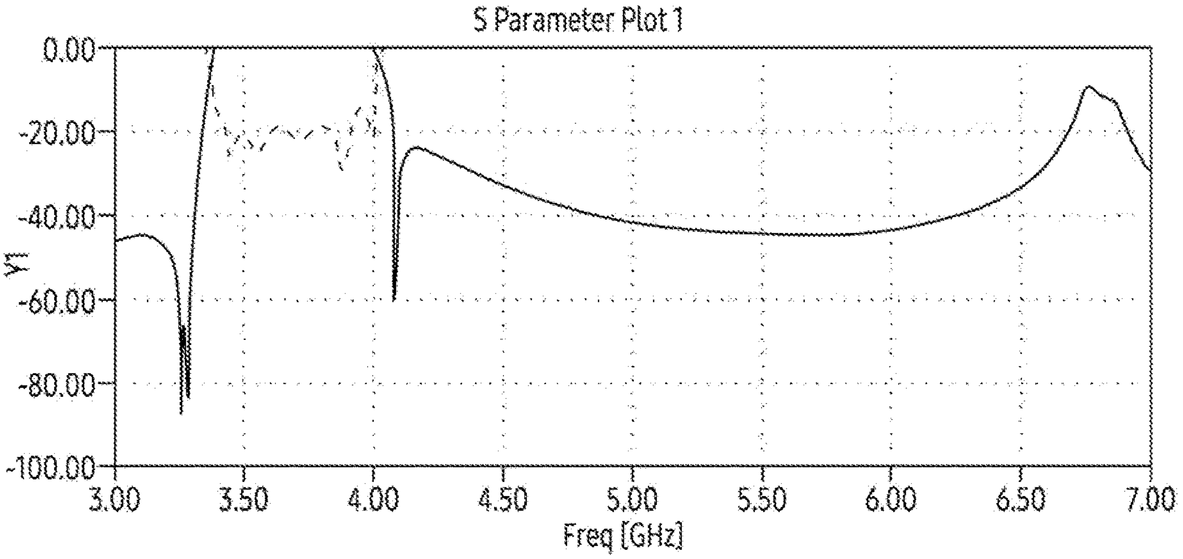
FIG. 6 is a schematic illustration of a passband of a cavity filtering device of the exemplary disclosure.

FIG. 4 is a side view of a cavity filtering device of the exemplary disclosure. FIG. 5 is a schematic structural diagram of a cavity filtering device of the exemplary disclosure. FIG. 6 is a schematic illustration of a passband of a cavity filtering device of the exemplary disclosure.

As shown in FIGS. 4 and 5, another embodiment of the disclosure also provides a cavity filtering device.

The device includes at least two of the multi-mode cavity filters 1 as shown in FIG. 1.

Two adjacent multi-mode cavity filters 1 are coupled via a coupling structure 2.

Two ends of the coupling structure 2 extend into the metal cavities 10 of the two adjacent multi-mode cavity filters 1, respectively, to couple with the resonance plates 221.

As shown in FIG. 5, the coupling position of the coupling structure 2 with the metal cavity 10 corresponds to a pair of opposite surfaces of one metal cavity 10. The coupling structure 2 is spaced apart from one of the resonance plates 221 corresponding to the surfaces to couple with the plurality of resonators 20. In this way, the two cavity filters 1 are coupled. It may be seen that the multi-mode cavity filters 1 are arranged along a straight line.

In the embodiment, since each of the multi-mode cavity filters 1 may form a null point by itself, and the null point with an adjustable position may be formed as inductive or capacitive. Therefore, the cavity filters 1 in the cavity filtering device of the embodiment may be arranged along a straight line, which is different from the cavity filters in the related art. The existing cavity filters need to produce a capacitive null point by the flying rod and provide a cross-coupling structure between cavities. Therefore, the embodiment greatly reduces the difficulty of designing and adjusting the cavity filtering device. The corresponding band pass characteristics are formed by a combination of the multi-mode cavity filters with different structures.

For example, as shown in FIG. 6, the cavity filtering device of the embodiment includes three multi-mode cavity filters 1, and thus the device includes three transmission null points, including two capacitive null points (left side of the passband) and one inductive null point (right side of the passband). In particular, the adjustable parameters in each of the multi-mode cavity filters 1 include: the height and diameter of the first resonance cylinder 211 and the second resonance cylinder 212 in the first resonator 21: the length, width, and number of the resonance plates 221 in the second resonator 22; the length, width, and thickness of the flange 223: the length, width, and number of the one or more resonance arms 222; and the like. The adjustable parameters of the coupling structure 2 include: the length, width, thickness, and the like of the coupling end corresponding to the resonance plates 221. Thus, the positions of the transmission null points and that of the transmission frequencies are adjusted, thereby adjusting the passband and transmission performance.

In the embodiment, the resonant frequencies are generated by the metal resonator. Due to the flexible shape and form design, and being easy to install, the metal resonator may meet the requirements for bandwidth and structure size at the same time.

According to embodiments, a multi-mode cavity filter may comprise a metal cavity formed into a hollow shape. The multi-mode cavity filter may comprise a plurality of resonators supported in suspension within the metal cavity and spaced from an inner wall of the metal cavity. The plurality of resonators may comprise a first resonator configured to generate a first resonant frequency. The plurality of resonators may comprise a second resonator electrically connected to the first resonator and configured to generate a second resonant frequency. The second resonator may comprise a plurality of resonance plates. A first number of the second resonant frequency may be associated with a second number of the plurality of resonance plates.

In an embodiment, the first resonator may be a coaxial resonator. The first resonator may comprise a first resonance cylinder and a second resonance cylinder. The first resonance cylinder and the second resonance cylinder may be coaxially connected in an axial direction. A first diameter of the first resonance cylinder may be greater than a second diameter of the second resonance cylinder. The first resonance cylinder and the second resonator may be separately connected to two ends of the second resonance cylinder.

In an embodiment, the plurality of resonance plates may be arranged radially around the second resonance cylinder. A first end of each of the plurality of resonance plates may be connected to an end portion of the second resonance cylinder. The first number of the second resonant frequency may be one less than the second number of the plurality of resonance plates.

In an embodiment, the plurality of resonance plates may be distributed at equal angular intervals.

In an embodiment, the second resonator may comprise one or more resonance arms. The one or more resonance arms extend radially from a second end of each of the plurality of resonance plates and the one or more resonance arms may be coplanar with the plurality of resonance plates. The first end of each of the plurality of resonance plates may be opposite to the second end of each of the plurality of resonance plates.

In an embodiment, a first width of each of the one or more resonance arms may be greater than or equal to a second width of each of the plurality of resonance plates. Each of the one or more resonance arms may form an angle with each of corresponding resonance plates of the plurality of resonance plates.

In an embodiment, the second resonator may comprise a flange connected to a second end of each of the plurality of resonance plates, the flange extending towards the first resonator in a direction perpendicular to the plurality of resonance plates.

In an embodiment, the multi-mode cavity filter may generate a null point. A strength of the null point may be associated with an impedance of the second resonator.

In an embodiment, the multi-mode cavity filter may comprise a tuning screw extending into the metal cavity to adjust a position of the null point.

In an embodiment, the tuning screw may be positioned one surface of the metal cavity. The tuning screw may be connected to at least portion of the first resonance cylinder.

According to embodiments, a cavity filtering device may comprise at least two multi-mode cavity filters. The cavity filtering device may comprise at least one coupling structure between two multi-mode cavity filters. Each of the at least two multi-mode cavity filters may comprise a metal cavity formed into a hollow shape. Each of the at least two multi-mode cavity filters may comprise a plurality of resonators supported in suspension within the metal cavity and spaced from an inner wall of the metal cavity. The plurality of resonators may comprise a first resonator configured to generate a first resonant frequency. The plurality of resonators may comprise a second resonator electrically connected to the first resonator and configured to generate a second resonant frequency. The second resonator may comprise a plurality of resonance plates. A first number of the second resonant frequency may be associated with a second number of the plurality of resonance plates.

In an embodiment, the first resonator may be a coaxial resonator. The first resonator may comprise a first resonance cylinder and a second resonance cylinder. The first resonance cylinder and the second resonance cylinder may be coaxially connected in an axial direction. A first diameter of the first resonance cylinder may be greater than a second diameter of the second resonance cylinder. The first resonance cylinder and the second resonator may be separately connected to two ends of the second resonance cylinder.

In an embodiment, the plurality of resonance plates may be arranged radially around the second resonance cylinder. A first end of each of the plurality of resonance plates may be connected to an end portion of the second resonance cylinder. The first number of the second resonant frequency may be one less than the second number of the plurality of resonance plates.

In an embodiment, the plurality of resonance plates may be distributed at equal angular intervals.

In an embodiment, the second resonator may comprise one or more resonance arms. The one or more resonance arms extend radially from a second end of each of the plurality of resonance plates and the one or more resonance arms may be coplanar with the plurality of resonance plates. The first end of each of the plurality of resonance plates may be opposite to the second end of each of the plurality of resonance plates.

In an embodiment, a first width of each of the one or more resonance arms may be greater than or equal to a second width of each of the plurality of resonance plates. Each of the one or more resonance arms may form an angle with each of corresponding resonance plates of the plurality of resonance plates.

In an embodiment, the second resonator may comprise a flange connected to a second end of each of the plurality of resonance plates, the flange extending towards the first resonator in a direction perpendicular to the plurality of resonance plates.

In an embodiment, the multi-mode cavity filter may generate a null point. A strength of the null point may be associated with an impedance of the second resonator.

In an embodiment, each of the at least two multi-mode cavity filters may comprise a tuning screw extending into the metal cavity to adjust a position of the null point. The multi-mode cavity filter may comprise a tuning screw extending into the metal cavity to adjust a position of the null point. The tuning screw may be positioned one surface of the metal cavity. The tuning screw may be connected to at least portion of the first resonance cylinder.

In an embodiment, two ends of a coupling structure may extend into metal cavities of the two adjacent multi-mode cavity filters, respectively, to couple with the plurality of resonance plates. The at least two adjacent multi-mode cavity filters may be arranged along a straight line.

Although the general principles of the disclosure have been described above in conjunction with the specific embodiments, it should be noted that the advantages, benefits, effects, and the like mentioned in the disclosure are merely examples and are not to be considered as limiting, and that these advantages, benefits, effects, and the like must be possessed by the various embodiments of the disclosure. Furthermore, the specific details disclosed above are for the purpose of example and easy understanding, but not for limitation. The above details do not limit the disclosure to be implemented using the above specific details.

It is also noted that the components or steps may be disassembled and/or recombined in the device, apparatus, and method of the disclosure. Such disassembled and/or recombined components or steps should be considered as equivalents to the disclosure.

The above description of the disclosed aspects is provided to enable anyone skilled in the art to make or use the disclosure. Various modifications to these aspects will be very apparent to those skilled in the art, and the generic principles defined herein may be applied to other aspects without departing from the scope of the application. Thus, the disclosure is not intended to be limited to the aspects shown herein, but is to be accorded the widest scope consistent with the principles and novel features disclosed herein.

The above description has been presented for the purpose of illustration and description. Furthermore, this description is not intended to limit the embodiments of the disclosure to the form disclosed herein. While various exemplary aspects and embodiments have been discussed above, those skilled in the art will recognize that certain modifications, adaptations, variations, additions, and sub-combinations thereof should be included within the scope of the disclosure.

What is claimed is:

1. A multi-mode cavity filter comprising:
- a metal cavity formed into a hollow shape; and
- a plurality of resonators supported in suspension within the metal cavity and spaced from an inner wall of the metal cavity,
- wherein the plurality of resonators comprises:
  - a first resonator configured to generate a first resonant frequency; and
  - a second resonator electrically connected to the first resonator and configured to generate one or more second resonant frequencies,
- wherein the second resonator comprises a plurality of resonance plates, and
- wherein the number of the one or more second resonant frequencies is associated with the number of the plurality of resonance plates.

2. The multi-mode cavity filter of claim 1, wherein the first resonator is a coaxial resonator;
- wherein the first resonator comprises a first resonance cylinder and a second resonance cylinder;
- wherein the first resonance cylinder and the second resonance cylinder are coaxially connected in an axial direction;
- wherein a first diameter of the first resonance cylinder is greater than a second diameter of the second resonance cylinder; and
- wherein the first resonance cylinder and the second resonator are separately connected to two ends of the second resonance cylinder.

3. The multi-mode cavity filter of claim 2, wherein the plurality of resonance plates are arranged radially around the second resonance cylinder;

wherein a first end of each of the plurality of resonance plates is connected to an end portion of the second resonance cylinder; and wherein the number of the one or more second resonant frequencies is one less than the number of the plurality of resonance plates.

4. The multi-mode cavity filter of claim 3, wherein the plurality of resonance plates are distributed at equal angular intervals.

5. The multi-mode cavity filter of claim 3, wherein the second resonator comprises one or more resonance arms; and wherein the one or more resonance arms extend radially from a second end of each of the plurality of resonance plates and the one or more resonance arms are coplanar with the plurality of resonance plates, and wherein the first end of each of the plurality of resonance plates is opposite to the second end of each of the plurality of resonance plates.

6. The multi-mode cavity filter of claim 5, wherein a first width of each of the one or more resonance arms is greater than or equal to a second width of each of the plurality of resonance plates; and wherein each of the one or more resonance arms forms an angle with each of corresponding resonance plates of the plurality of resonance plates.

7. The multi-mode cavity filter of claim 3, wherein the second resonator comprises a flange connected to a second end of each of the plurality of resonance plates, the flange extending towards the first resonator in a direction perpendicular to the plurality of resonance plates.

8. The multi-mode cavity filter of claim 7, wherein the multi-mode cavity filter generates a null point; and wherein a strength of the null point is associated with an impedance of the second resonator.

9. The multi-mode cavity filter of claim 8, comprising a tuning screw extending into the metal cavity to adjust a position of the null point.

10. The multi-mode cavity filter of claim 9, wherein the tuning screw is positioned on one surface of the metal cavity, and wherein the tuning screw is connected to at least portion of the first resonance cylinder.

11. A cavity filtering device comprising:

at least two multi-mode cavity filters; and at least one coupling structure between of the two multi-mode cavity filters, wherein each of the at least two multi-mode cavity filters comprises:

a metal cavity formed into a hollow shape; and a plurality of resonators supported in suspension within the metal cavity and spaced from an inner wall of the metal cavity, wherein the plurality of resonators comprises:

a first resonator configured to generate a first resonant frequency; and a second resonator electrically connected to the first resonator and configured to generate a second resonant frequency, wherein the second resonator comprises a plurality of resonance plates, and wherein the number of the one or more second resonant frequencies is associated with the number of the plurality of resonance plates.

12. The cavity filtering device of claim 11, wherein the first resonator is a coaxial resonator;

wherein the first resonator comprises a first resonance cylinder and a second resonance cylinder;

wherein the first resonance cylinder and the second resonance cylinder are coaxially connected in an axial direction;

wherein a first diameter of the first resonance cylinder is greater than a second diameter of the second resonance cylinder; and wherein the first resonance cylinder and the second resonator are separately connected to two ends of the second resonance cylinder.

13. The cavity filtering device of claim 12, wherein the plurality of resonance plates are arranged radially around the second resonance cylinder;

wherein a first end of each of the plurality of resonance plates is connected to an end portion of the second resonance cylinder; and wherein the number of the one or more second resonant frequencies is one less than the number of the plurality of resonance plates.

14. The cavity filtering device of claim 13, wherein the plurality of resonance plates are distributed at equal angular intervals.

15. The cavity filtering device of claim 13, wherein the second resonator comprises one or more resonance arms; and wherein the one or more resonance arms extend radially from a second end of each of the plurality of resonance plates and the one or more resonance arms are coplanar with the plurality of resonance plates, and wherein the first end of each of the plurality of resonance plates is opposite to the second end of each of the plurality of resonance plates.

16. The cavity filtering device of claim 15, wherein a first width of each of the one or more resonance arms is greater than or equal to a second width of each of the plurality of resonance plates; and wherein each of the one or more resonance arms forms an angle with each of corresponding resonance plates of the plurality of resonance plates.

17. The cavity filtering device of claim 13, wherein the second resonator comprises a flange connected to a second end of each of the plurality of resonance plates, the flange extending towards the first resonator in a direction perpendicular to the plurality of resonance plates.

18. The cavity filtering device of claim 17, wherein the multi-mode cavity filter generates a null point; and wherein a strength of the null point is associated with an impedance of the second resonator.

19. The multi-mode cavity filter of claim 18, wherein each of the at least two multi-mode cavity filters comprising a tuning screw extending into the metal cavity to adjust a position of the null point, wherein the tuning screw is positioned on one surface of the metal cavity, and wherein the tuning screw is connected to at least portion of the first resonance cylinder.

20. The cavity filtering device of claim 11, wherein two ends of the at least one coupling structure extend into metal cavities of the two adjacent multi-mode cavity filters, respectively, to couple with the plurality of resonance plates, and wherein the at least two adjacent multi-mode cavity filters are arranged along a straight line.

* * * * *